Sept. 4, 1928.　　　　　　　　　　　　　　1,683,386
W. A. GEIGER
CAR CONSTRUCTION
Filed June 4, 1927
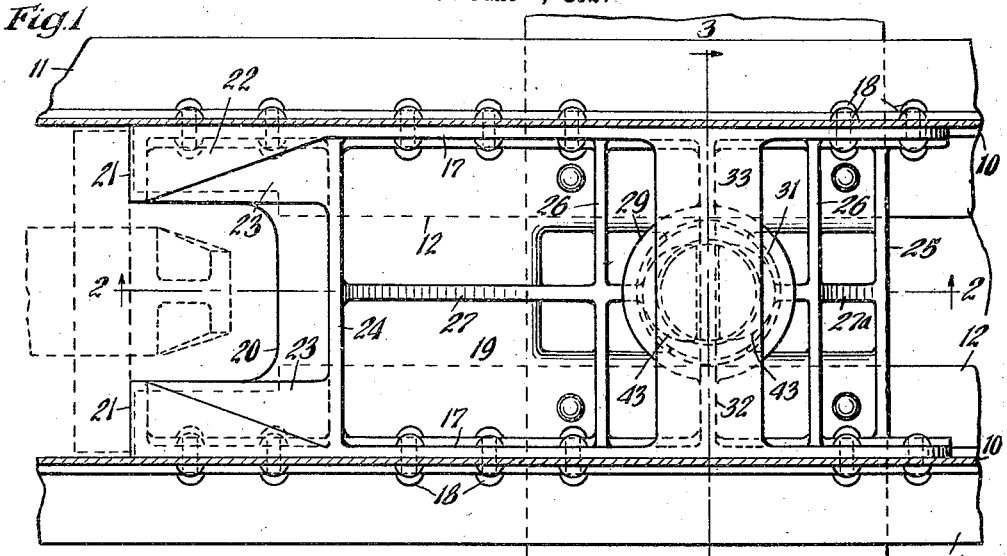
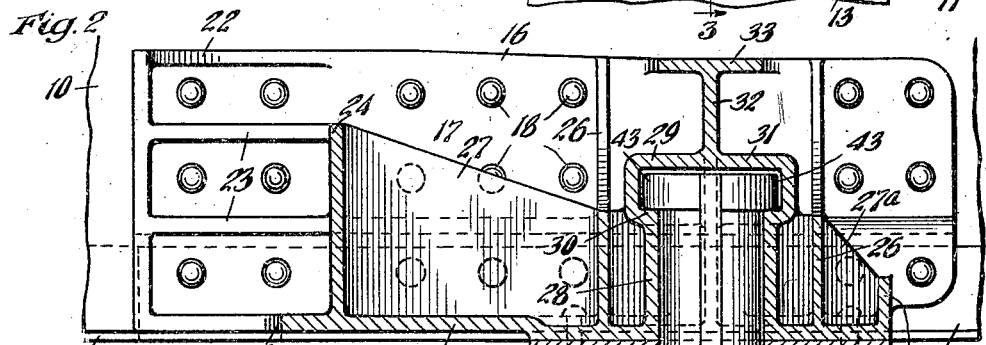
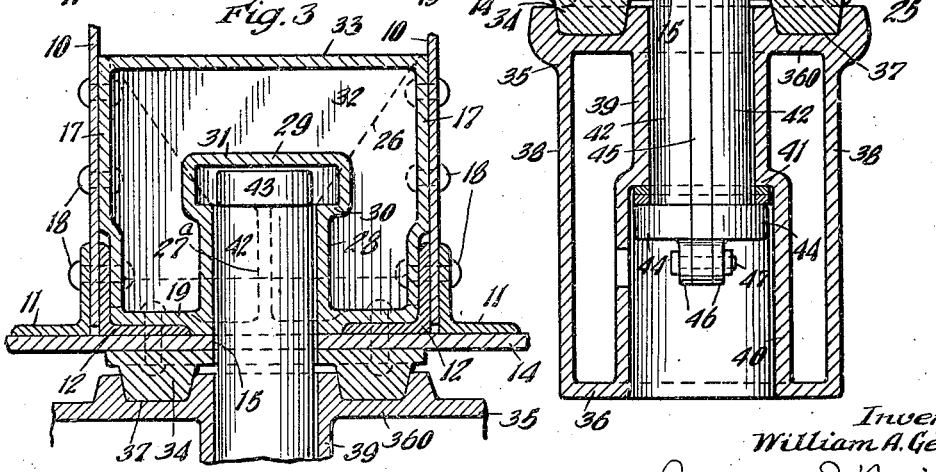
Inventor
William A. Geiger
By George D Haight
His Atty.

Patented Sept. 4, 1928.

1,683,386

UNITED STATES PATENT OFFICE.

WILLIAM A. GEIGER, OF CHICAGO, ILLINOIS, ASSIGNOR TO W. H. MINER, INC., OF CHICAGO, ILLINOIS, A CORPORATION OF DELAWARE.

CAR CONSTRUCTION.

Application filed June 4, 1927. Serial No. 196,542.

This invention relates to improvements in car construction.

In the operation of railroads, experience has shown the advisability of so connecting the body and truck bolsters of the car that they cannot separate vertically in event of a collision or derailment since this effectually prevents or minimizes turning over or telescoping of the cars. In car construction, filler castings disposed between the center sills and provided with king pin openings are being used, especially in conjunction with cars having four-wheel trucks, the latter being provided with the usual truck bolsters having an opening for the king pin. In equipment of this character it is impossible or impracticable to use locking center pins for the reason that the parts are not adapted to accommodate locking pins.

The object of this invention is to provide a car construction including a novel type of filler casting and truck bolster having means for the accommodation of a split type of locking pin whereby means are provided for locking the truck bolster to the underframing of the car.

A more particular object of the invention is to provide a filler casting and truck bolster arrangement wherein the filler casting is so formed as to provide a center pin recess closed at the top and having suitable shoulders for accommodating the head of the locking pin when inserted from below, in conjunction with a truck bolster also having means permitting insertion of the pin from below and formed to provide shoulders, co-operating with the pin for locking the filler casting to the truck bolster, the pin comprising locking sections and a spreader, and so designed that the spreader may be supported in position from the bottom portions of the pin sections.

Other and further objects of the invention will more fully and clearly appear from the description and claims hereinafter following.

In the drawings forming part of this specification, Figure 1 is a top plan view partially in section, of a portion of the under-framing of a railway car, and showing the invention in connection therewith. Figure 2 is a longitudinal sectional view of the invention corresponding substantially to line 2—2 of Figure 1. And Figure 3 is a transverse sectional view of the invention corresponding substantially to line 3—3 of Figure 1.

In the drawings, portions of the center sills of the car are shown, each of the same compressing a vertically disposed plate 10, having angle members 11—11 secured to the lower outer edges thereof, and having oppositely disposed angle members 12—12 secured to the lower inner edges thereof. A body bolster is provided, indicated at 13, and comprises top and bottom cover plates and diaphragms in the usual manner, the bottom cover plate indicated at 14 being provided with an opening 15 for the passage of the king pin, as best shown in Figure 3.

Disposed between the center sill plates 10—10 adjacent the bolster 13, is a filler casting, indicated as a whole by the reference character 16. The casting 16 comprises side walls 17—17 secured to the inner faces of the center sill plates 10 by means of rivets 18. Integrally formed with the lower edges of the side walls, and connecting the same, is a bottom wall 19 which rests upon the horizontally extending flanges of the angular members 12—12, the bottom and side walls of the casting being so formed as to provide off-sets for the reception of the angle members 12—12. As best shown in Figure 2, the bottom wall is cut out at its forward portion as indicated at 20 to provide clearance for the end of the draft yoke shown in dotted lines in Figure 1, the portion of the bottom wall at each side of the cut-out being integrally connected with oppositely extending inturned flanges 21—21, formed upon the forward ends of the side walls 17—17, the flanges 21—21 being arranged to provide stops for the rear portion of the shock absorbing mechanism. The flanges 21—21 are braced by means of top ribs 22—22 extending from each of the flanges in an inclined direction toward the adjacent side walls of the filler casting. Additional bracing ribs indicated at 23 are provided which merge with a transversely extending forward wall 24. At the opposite end of the filler casting there is provided a rear wall or diaphragm 25 which connects the side and bottom walls of the casting. Intermediate the front and rear walls 24 and 25 are provided spaced transversely extending diaphragms 26—26, which are inclined from their outer edges inwardly toward the longitudinal center line of the casting, said diaphragms being connected with the front and rear walls 24 and 25 by means of longitudinally extending webs 27 and 27ª. Between the transversely disposed diaphragms 26—26 is formed a king pin section comprising a cylindrical member 28 formed integrally with the bottom wall of the casting, and opening through said bottom wall in such manner as to coincide with the king pin opening 15 formed in the bottom plate 14 of the bolster 13. The cylindrical section 28 extends vertically upwardly from the bottom wall 19 of the casting somewhat less than half the height of the casting, and at its upper end is provided with a hollow enlargement 29, the bottom extremity of which merges with the cylindrical portion 28 and provides an annular shoulder or ledge 30 adapted to co-operate with the locking pin hereinafter referred to. The cylindrical wall of the enlargement 29 terminates in an integral top wall 31 which closes the upper end of the cylindrical member as shown. Formed integrally with the top wall 31 is a vertically disposed transversely extending strengthening web 32 which at its ends is integrally formed with the side walls 17—17 and at its top is integrally formed with a horizontally disposed plate 33, the opposite ends of which are also integrally connected with the side wall 17—17 of the casting. Secured to the under-surface of the bottom cover plate 14 of the bolster is a center plate 34 adapted to co-operate with the truck bolster.

The truck bolster, indicated at 35, for the most part is of the usual hollow cast steel construction, including a top wall 360 having a center plate section 37 adapted to accommodate the annular rib on the center plate section 34 secured to the body bolster. The truck bolster also includes side walls 38—38, and a bottom wall 36. In order to provide the bolster with means for accommodating a locking pin a central upper cylindrical section 39 is provided, opening upwardly through the top of the bolster, said section being of a diameter sufficient in size to rather snugly accommodate a locking pin when the latter is in position, the section 39 being integrally formed with the top wall 360 of the truck bolster. The cylindrical section 39 extends downwardly from the top wall a suitable distance, and merges with a larger cylindrical section 40 which at its lower ends is integrally connected with the bottom wall 36, the different diameters of the upper and lower sections providing an off-set annular shoulder 41 for co-operation with the locking pin. The lower section 40 is of such size as to permit the insertion and manipulation of the locking pin when the same is being applied or removed from position.

The locking pin is of the sectional two-piece split type, and comprises two side members 42—42, each of approximately semi-circular cross section, said members having laterally extending flanges at the top and bottom ends thereof as indicated at 43 and 44, said flanges being adapted to fit over the annular shoulders 30 and 41 of the filler casting and truck bolster respectively. The members 42—42 are so proportioned that when put into place in face to face contact, they may be inserted upwardly through the cylindrical sections 40 and 39, the opening 15 in the bolster bottom cover plate 14 and the cylindrical section 28, and then being spread apart and held in separative condition by means of a spreader 45. The spreader is supported from the side members 42—42, said members being provided at the lower ends with integral lugs 46—46 having apertures for the reception of a retaining bolt 47 which extends through the lugs and an opening in the lower end of the spreader, whereby the spreader is prevented from dropping out of position and maintains the side members 42—42 in position so that the flanges 43 and 44 remain behind the annular shoulders 30 and 41 provided by the filler casting and truck bolster.

In the use of the invention, when it is desired to remove the locking pin access may be gained through the chamber provided by the cylindrical section 40, to the bolt 47. When said bolt is removed, the spreader may be retracted downwardly, permitting the side sections 42—42 to be brought into contact to such an extent as to disengage the flanges 43—43 from the annular shoulder 30, and said members removed downwardly. In applying the pin, the side sections 42—42 are first inserted, after which the spreader is placed in position, and the bolt extended through the lugs on the side members and the spreader held thereby against removal, said spreader serving to maintain the side members 42—42 in separated relation so as to maintain the engagement of the flanges 43—43 and 44—44 with the shoulders 30 and 41, respectively.

While I have herein shown and described what I consider the preferred manner of carrying out the invention, the same is merely illustrative, and I contemplate all changes and modifications which come within the scope of the claims appended hereto.

I claim:

1. In car construction, the combination with the under-framing of a railway car, including center sills and a body bolster; of a filler casting having side walls secured to said center sills and a bottom wall connecting said side walls, and a cylindrical center pin receiving member opening through said bottom wall, formed integrally therewith and extending upwardly therefrom, said cylindrical member being provided with an enlargement closing the upper portion thereof and providing an annular shoulder; a truck bolster provided with a center pin opening and having means providing an off-set forming an annular shoulder; and a split locking pin comprising side members having flanges at their opposite ends, and insertable into the cylindrical member in the filler casting and the king pin opening in said truck bolster, and a spreader connected to said pin for maintaining the side members in spaced relation to cause engagement of the flanges thereof with the annular shoulders of said filler casting and of said truck bolster.

2. In car construction, the combination with a filler casting having a cylindrical member adapted for the reception of a center pin, and a truck bolster having a cylindrical section for accommodating a center pin, means being provided in said filler casting and said truck bolster to form opposed bearing surfaces; and a split locking pin comprising semi-circular members, each having a laterally extending flange at each end and together insertable into said cylindrical member and said cylindrical section of said casting and truck bolster respectively, and a spreader insertable between said semi-circular members to spread the same and cause engagement of the flanges on the said pin members with the opposed bearing surfaces of said casting and said truck bolster.

3. In car construction, the combination with a filler casting having a cylindrical member adapted for the reception of a center pin, and a truck bolster having a cylindrical section for accommodating a center pin, means being provided in said filler casting and said truck bolster to form opposed bearing surfaces; and a split locking pin comprising semi-circular members, each having a laterally extending flange at each end and together insertable into said cylindrical member and said cylindrical section of said casting and truck bolster respectively, and a spreader insertable between said semi-circular members to spread the same and cause engagement of the flanges on the said pin members with the opposed bearing surfaces of said casting and said truck bolster, said pin members and said spreader being insertable from the under-surface of said truck bolster into said cylindrical member and said cylindrical section of the casting and bolster respectively.

4. In car construction, the combination with a filler casting having a cylindrical member adapted for the reception of a center pin, and a truck bolster having a cylindrical section for accommodating a center pin, means being provided in said filler casting and said truck bolster to form opposed bearing surfaces; and a split locking pin comprising semi-circular members, each having a laterally extending flange at each end and together insertable into said cylindrical member and said cylindrical section of said casting and truck bolster respectively, and a spreader insertable between said semi-circular members to spread the same and cause engagement of the flanges on the said pin members with the opposed bearing surfaces of said casting and said truck bolster, said pin members and said spreader being insertable from the under-surface of said truck bolster into said cylindrical member and said cylindrical section of the casting and bolster respectively, said pin members having means for supporting said spreader from the bottom ends of said pin members.

5. In car construction, the combination with the under-framing of a car including center sills and body bolster; of a combined back stop and draft lug filler casting secured to said center sills and bolster, said filler casting being provided with a cylindrical member for the reception of a center pin, said cylindrical member being provided with a laterally extending bearing portion; of a truck bolster having means providing a center pin opening, and having laterally extending bearing portions opposed to those of the cylindrical member of the casting; and a split locking pin comprising members flanged at opposite ends, and insertable into the center pin openings of said casting and said truck bolster, and a spreader insertable between said flanged pin members for spreading the same and causing engagement of the flanges thereon with the opposed bearing portions of said filler and truck bolster; and means for supporting said spreader from the lower ends of said flanged pin members.

6. As an article of manufacture, a filler casting adapted for use in connection with the under-framing of a railway car, comprising side and bottom walls, and a cylindrical member extending upwardly from said bottom wall and opening through the latter, the upper portion of said cylindrical member being provided with an enlargement closing the top of said member and providing an annular shoulder for the reception of a locking pin.

7. As an article of manufacture, a filler casting adapted for use in connection with the under-framing of a railway car, comprising side and bottom walls, and a cylindrical member extending upwardly from said bottom wall and opening through the latter, the upper portion of said cylindrical member being provided with an enlargement closing the top of said member and providing an annular shoulder for the reception of a locking pin, said enlargement being integrally formed with means connecting the side walls of said filler casting.

8. In car construction, the combination with the underframing of a railway car; of a body bolster; a filler casting permanently secured to said bolster, said casting including a cylindrical sleeve-like member receiving the center pin, said cylindrical member being closed at the top and open at the bottom; a truck bolster having a cylindrical sleeve-like section accommodating a center pin; and a sectional locking pin detachably connecting the cylindrical member of the filler casting and the cylindrical section of the truck bolster, the sections of said pin being insertible through the cylindrical sleeve-like section of the truck bolster, said sectional locking pin including side members and a spreading member interposed therebetween, said side members having shouldered engagement with the cylindrical member of the body bolster and the cylindrical section of the truck bolster to lock said pin against removal.

In witness that I claim the foregoing I have hereunto subscribed my name this 31st day of May 1927.

WILLIAM A. GEIGER.